(12) United States Patent
Hay

(10) Patent No.: US 10,029,953 B2
(45) Date of Patent: Jul. 24, 2018

(54) COMPOSITION FOR DUST CONTROL AND IMPROVED MATERIAL HANDLING

(71) Applicant: ECOLAB USA INC., St. Paul, MN (US)

(72) Inventor: Daniel N. T. Hay, Naperville, IL (US)

(73) Assignee: ECOLAB USA INC., St. Paul, MN (US)

(*) Notice: Subject to any disclaimer, the term of this patent is extended or adjusted under 35 U.S.C. 154(b) by 0 days.

(21) Appl. No.: 15/334,505

(22) Filed: Oct. 26, 2016

(65) Prior Publication Data
US 2017/0044079 A1 Feb. 16, 2017

Related U.S. Application Data

(63) Continuation of application No. 14/308,291, filed on Jun. 18, 2014, now Pat. No. 9,505,965.

(51) Int. Cl.
B01J 2/30 (2006.01)
B05B 9/00 (2006.01)
C09K 3/22 (2006.01)
C05G 3/00 (2006.01)
C05G 3/10 (2006.01)
C05B 7/00 (2006.01)
C05D 1/00 (2006.01)

(52) U.S. Cl.
CPC ............ *C05G 3/0088* (2013.01); *B01J 2/30* (2013.01); *B05B 9/00* (2013.01); *C05B 7/00* (2013.01); *C05D 1/005* (2013.01); *C09K 3/22* (2013.01)

(58) Field of Classification Search
None
See application file for complete search history.

(56) References Cited

U.S. PATENT DOCUMENTS

| 4,389,506 A | 6/1983 | Hassall, Jr. | |
| 4,780,233 A * | 10/1988 | Roe | C09K 3/22 106/285 |
| 5,089,540 A | 2/1992 | Armbruster et al. | |
| 5,181,957 A | 1/1993 | Gross et al. | |
| 5,244,473 A | 9/1993 | Sardessai et al. | |

(Continued)

FOREIGN PATENT DOCUMENTS

| CN | 103305187 A | 9/2013 |
| CN | 103429683 A | 12/2013 |

(Continued)

OTHER PUBLICATIONS

Osswald et al., Material Science of Polymers for Engineers, "Influence of Processing in Properties", 2003, pp. 334-335.

(Continued)

*Primary Examiner* — Joseph D Anthony
(74) *Attorney, Agent, or Firm* — Kagan Binder, PLLC

(57) ABSTRACT

The invention provides methods and compositions for blends of glycerin and polyvinyl acetate emulsions which effectively decrease the dust forming tendency of particulate materials such as mineral fertilizer(s). These blends also reduce the caking tendency of mineral fertilizer(s), helping to maintain a free flowing material. Formulations based on these components, possibly including other additives, may also be useful for dust control and/or anticaking on other particulate materials including fertilizers, ores, coal, grain, etc.

13 Claims, 3 Drawing Sheets

Dusting

Free Flowing

(56) References Cited

U.S. PATENT DOCUMENTS

| | | | |
|---|---|---|---|
| 5,441,566 A * | 8/1995 | Vaughan | C09K 3/22 118/300 |
| 5,487,764 A | 1/1996 | Ford, Jr. | |
| 5,622,561 A * | 4/1997 | Cummins | B01F 13/0013 118/303 |
| 5,648,116 A | 7/1997 | Roe et al. | |
| 5,747,104 A | 5/1998 | Baebel | |
| 7,398,935 B2 | 7/2008 | Tran et al. | |
| 7,938,934 B2 * | 5/2011 | Todorovic | B01F 5/0077 162/158 |
| 8,066,448 B2 * | 11/2011 | Vitale | C09K 3/22 404/75 |
| 8,070,384 B1 * | 12/2011 | Vitale | C09K 3/22 404/72 |
| 8,132,982 B2 * | 3/2012 | Vitale | C09K 3/22 252/88.1 |
| 8,163,059 B2 | 4/2012 | Tran et al. | |
| 8,298,434 B2 | 10/2012 | Wei et al. | |
| 8,465,667 B2 * | 6/2013 | Davis | C10L 9/10 252/88.1 |
| 8,469,629 B2 * | 6/2013 | Vitale | C09K 3/22 252/88.1 |
| 9,017,767 B2 | 4/2015 | Wolff et al. | |
| 9,487,916 B2 | 11/2016 | Zhao et al. | |
| 9,505,965 B2 | 11/2016 | Hay | |
| 2006/0151741 A1 * | 7/2006 | Wynne | C09K 17/40 252/88.1 |
| 2008/0072641 A1 | 3/2008 | Ogzewalla | |
| 2009/0025276 A1 | 1/2009 | Tran | |
| 2009/0178452 A1 | 7/2009 | Ogzewalla | |
| 2009/0189113 A1 | 7/2009 | Lamperd et al. | |
| 2009/0238887 A1 | 9/2009 | Becker et al. | |
| 2010/0047443 A1 * | 2/2010 | Wynne | C09K 17/40 427/136 |
| 2010/0284741 A1 * | 11/2010 | Vitale | E01C 21/00 404/76 |
| 2011/0280658 A1 | 11/2011 | Vitale et al. | |
| 2011/0299925 A1 * | 12/2011 | Vitale | E01C 21/00 404/76 |
| 2012/0168673 A1 * | 7/2012 | Vitale | E01C 21/00 252/88.1 |
| 2012/0247006 A1 | 10/2012 | Davis et al. | |
| 2012/0248369 A1 * | 10/2012 | Blubaugh | C09K 3/22 252/88.1 |
| 2012/0272700 A1 * | 11/2012 | Nevin | C05C 9/005 71/12 |
| 2014/0264156 A1 * | 9/2014 | Hay | C05G 3/0035 252/88.1 |
| 2015/0115197 A1 * | 4/2015 | Bloomer | C05G 3/0088 252/88.1 |
| 2015/0144836 A1 * | 5/2015 | Hay | C09K 3/22 252/88.1 |
| 2017/0044079 A1 * | 2/2017 | Hay | C05G 3/0088 |

FOREIGN PATENT DOCUMENTS

| | | |
|---|---|---|
| JP | 2011042741 A | 3/2011 |
| WO | 2002012574 A1 | 2/2002 |
| WO | 2004058933 A1 | 7/2004 |

OTHER PUBLICATIONS

Kirk-Othmer, "Emulsions", Encyclopedia of Chemical Technology, Fourth Edition, vol. 9, pp. 397-403.

International Search Report for International Application No. PCT/US2015/033591, dated Aug. 10, 2015, 3 pages.

Written Opinion or International Application No. PCT/US2015/033591, dated Aug. 10, 2015, 6 pages.

John Wiley & Sons, Encyclopedia of Polymer Science and Engineering, 1990, Index p. 751.

H. Yildirim Erbil, "Vinyl Acetate Emulsion Polymerization and Copolymerization With Acrylic Monomers", 2000, Chapter 5, pp. 165-167.

Polymer Handbook, Fourth Edition, 1999, "Physical Properties of Monomers", p. III/1.

"Modern Adhesive Technical Manual", 1st Edition, Edited by ZiDong Li, Jan. 2002, pp. 478-487 (English Translation not available).

Extended European Search Report for European Application No. 15809370.8, dated Jan. 30, 2018, 10 pages.

* cited by examiner

Free Flowing

Caking

COMPOSITION FOR DUST CONTROL AND IMPROVED MATERIAL HANDLING

CROSS-REFERENCE TO RELATED APPLICATIONS

This application is being filed as a continuation application of U.S. patent application Ser. No. 14/308,291, filed on Jun. 18, 2014, entitled "COMPOSITION FOR DUST CONTROL AND IMPROVED MATERIAL HANDLING."

STATEMENT REGARDING FEDERALLY SPONSORED RESEARCH OR DEVELOPMENT

Not Applicable.

BACKGROUND OF THE INVENTION

The present invention relates generally to one or more methods, compositions of matter, and or apparatuses useful in suppressing dust release from and in preventing the caking of particulate materials.

Particulate materials tend to contain fines or to be friable and form fines, and these fines can be a dust releasing nuisance. Also, these materials tend to harden and form large, agglomerated masses due to a number of factors including exposure to moisture in humid environments, particularly during long periods of storage. These hardened masses are generally referred to as cakes. Some cake formations become very rigid and resistant to separation, making the particulate material very difficult to transport and to break apart when it needs to be applied and used.

In addition, economization and automation of processes for handling, transporting, and applying particulate materials requires that it be in a form so that it can flow freely. In emptying storage containers containing tons of particulate materials, for example, there is increased operational expense and potential danger on account of the tendency of the particulate materials to cake. The particulate material cakes must be disintegrated by costly and cumbersome mechanical auxiliary apparatus in order to be emptied or loaded. Additionally, during commercial use of the particulate materials, any step of dosing or mixing agglomerated or caked particulate materials together with other substances can be difficult due to the extent of the caking.

As a result there is ongoing need and clear utility in a novel improved method and/or composition and/or apparatus for reducing caking and dust release from particulate materials. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR § 1.56(a) exists.

BRIEF SUMMARY OF THE INVENTION

To satisfy the long-felt but unsolved needs identified above, at least one embodiment of the invention is directed towards a method of inhibiting the release of dust from a pile of particulate material. The method comprises the step of applying to the exposed surface of the pile a composition comprising PVA and glycerin in a ratio of between 90:10 and 10:90 and/or between 100:1 and 1:100. The composition may further comprise water but does not pass significant amounts of water to the pile. The particulate material may exclude low-ranked coal, and/or may exclude coal. The composition may exclude VAE, crude glycerin, and/or polymer derivatives of glycerin.

The particulate material is fertilizer being handled by a fertilizer handling process flow. The fertilizer handling process flow may be constructed and arranged such that but for the presence of the composition, the particulate material would form one item selected from the list consisting of: ratholes, arches, pinch points, and any combination thereof. The fertilizer handling process flow may be constructed and arranged such that but for the presence of the composition, the particulate material would cake. The fertilizer handling process flow may be constructed and arranged such that but for the presence of the composition, the particulate material would cake but would not form one item selected from the list consisting of: ratholes, arches, pinch points, and any combination thereof.

Additional features and advantages are described herein, and will be apparent from, the following Detailed Description.

BRIEF DESCRIPTION OF THE DRAWINGS

A detailed description of the invention is hereafter described with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION OF THE INVENTION

Figure 1A:
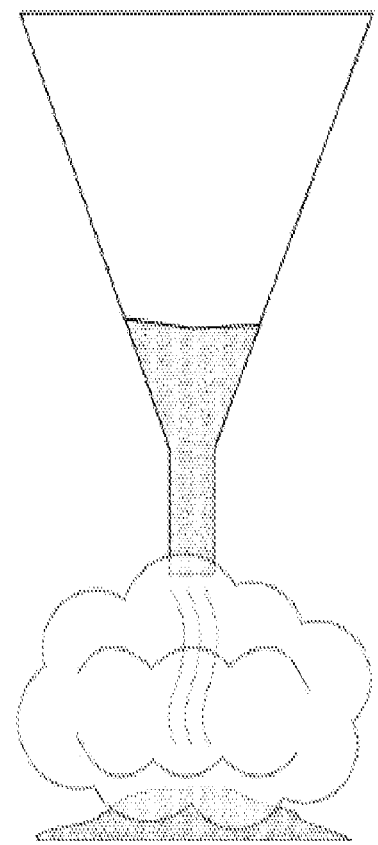
FIG. 1A is an illustration of dusting present in particulate material absent the inventive composition.

The following definitions are provided to determine how terms used in this application, and in particular how the claims, are to be construed. The organization of the definitions is for convenience only and is not intended to limit any of the definitions to any particular category.

"Arching" means an obstruction in the flow of particulate material through a portion of a particulate material handling process formed out of particulate material which has agglomerated into the form of an arch, the arching can be cohesive (formed by particle to particle bonds), interlocking (formed by particles which are large relative to the size of an outlet it passes through and are compacted together by mechanical force such as a collapsing rathole), or both.

"Crude glycerin" means a by-product derivative from a transesterification reaction involving triglycerides including transesterification reactions involving biodiesel manufacturing processes, in which the by-product comprises glycerin and at least one component selected from the list consisting of: fatty acids, esters, salt, methanol, tocopherol, sterol, mono-glycerides, di-glycerides, and tri-glycerides.

"Curing" means the process of converting a material including but not limited to a polymeric material from substantially viscous state through a process of gelation in which the material may become more rigid due to a process including but not limited to the formation of three-dimensional cross linkages between polymer chains; and ultimately to a vitrified state which may be a state in which the material is at least as rigid as glass, and in which substantially up to 100% of the potential cross-linkages may have been formed, some materials may become less than 100% vitrified at STP and require additional energy inputs to become fully vitrified. It is further described in the textbook: *Materials Science of Polymers for Engineers*, by Tim Osswald, et al., Hanser Verlag. pp. 334-335 (2003).

"STP Curing" means the extent to which a material will cure without the input of additional energy under STP conditions, STP curing includes, such additional energy does not include the effects of STP evaporation but may include energy inputs by items such as but not limited to electron beams, radiation, heat, chemical additives, and any combination thereof. STP curing often will transition a material to a gelation state but not to a fully vitrified state.

"Mong" means non glycerol organic material and typically consists of soaps, free fatty acids, and other impurities.

"Particulate material" means a material that has a tendency to form dust particles when handled, processed, or contacted, which includes but is not limited to coal, dirt, wood chips, agricultural products, fruits, fertilizers, ores, mineral ores, fine materials, sand, gravel, soil, fertilizers, or other dust generating material, and any combination thereof.

"Pinch Point" means a piece of equipment or portion thereof present in an industrial process through which there is a general flow of particulate material but due to the shape of the piece of equipment or portion thereof, the flow of a portion of the material becomes impinged and that portion remains stationary for a period of time, exemplary industrial processes include but are not limited to material processing, material refining, material handling, material grinding, material transporting, material loading, material storing, material unloading, and applying the material, exemplary types of equipment include but are not limited to chutes, bent or curved pipes, channels, or ducts (elbows), or spaces small enough such that bridges of agglomerated materials collect. Pinch points can cause arching and ratholing of the flowing particulate material.

"PVA" means polyvinyl acetate polymer.

"Ratholing" means the obstructing of the flow of particulate material through a portion of a material handling process formed out of particulate material which has cohesive strength (formed by particle to particle bonds) such that while some of the material flows along a channel within the mass of material, material which is outside of the channel becomes stagnant and does not flow. Ratholes may collapse in the presence of external force such as vibration and when they collapse they may reform into arches.

"Stable Emulsion" means an emulsion in which droplets of a material dispersed in a carrier fluid that would otherwise merge to form two or more phase layers are repelled from each other by an energy barrier, the energy barrier may be at least 20 kT, more, or less, the repulsion may have a half-life of at least a few years. Enabling descriptions of emulsions and stable emulsions are stated in general in *Kirk-Othmer, Encyclopedia of Chemical Technology*, Fourth Edition, volume 9, and in particular on pages 397-403.

"VAE" means vinyl acetate ethylene co-polymer, a specific kind of PVA. In at least one embodiment the repeating units of VAE are selected from one of formula I, II, III, IV, and any combination thereof wherein:

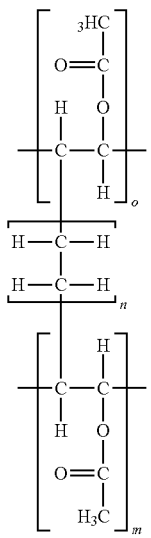

Formula (I)

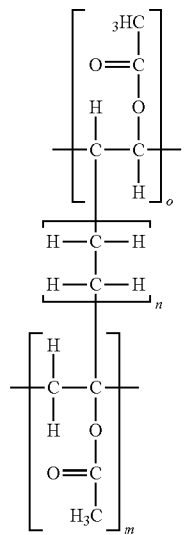

Formula (II)

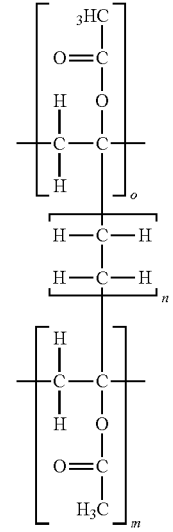

Formula (III)

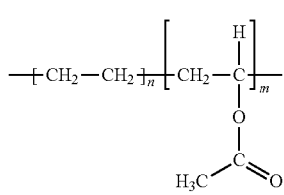

Formula (IV)

wherein n is the number of cross linking units, m is the number of first chain units, and o is the number of second chain units, either, some, or all of n, m, and o can be 1 or more, although m and o will frequently be 2 or 3 or 4 or more, either or both of the first and second chain units can be left side end (terminal) units of a polymer chain and/or right side end (terminal) units of a polymer chain. VAE can also comprise co-polymers containing additional cross linking units and can comprise additional polymer chains.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the Kirk-Othmer Encyclopedia of Chemical Technology, 5th Edition, (2005), (Published by Wiley, John & Sons, Inc.) this definition shall control how the term is to be defined in the claims. All illustrated chemical structures also include all possible stereoisomer alternatives.

In at least one embodiment of the invention a composition of matter is added to a particulate material. The composition comprises PVA and glycerin. The application of the composition both reduces the tendency of the particulate material to release dust and also reduces the tendency of the particulate material to cake. In at least one embodiment the composition is a blend of the constituent materials. In at least one embodiment the PVA is in the form of an emulsion. In at least one embodiment the composition is applied to the particulate material as a liquid. In at least one embodiment the composition is applied to the particulate material as foam.

As illustrated in FIG. 1A a sample of particulate material granules produces large amounts of fugitive dust. This is because ultra-fine particulate material particles are so light that they can be suspended and travel aloft when contacted by moving air. Particulate material commonly becomes ultra-fine due to excessive grinding or due to attrition of the delicate particulate material masses during processing or handling.

Figure 1B:
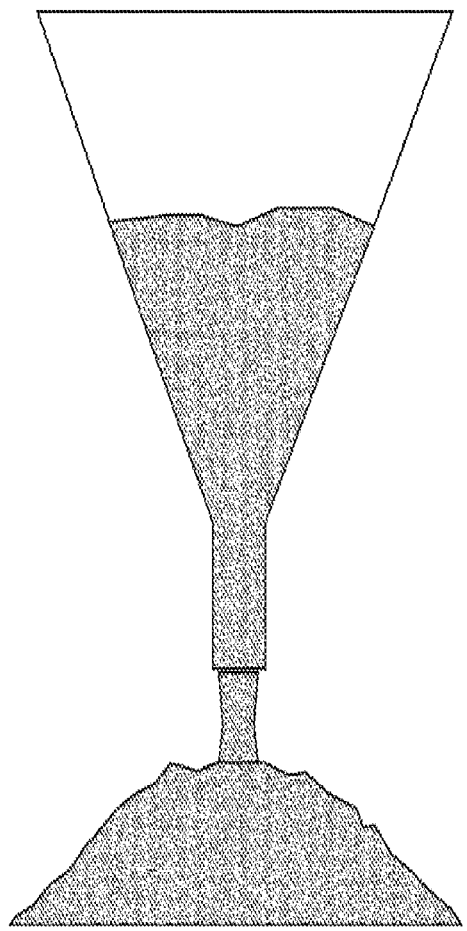
FIG. 1B is an illustration of the resolution of dusting and caking problems in particulate material treated with the inventive composition.
Figure 1C:
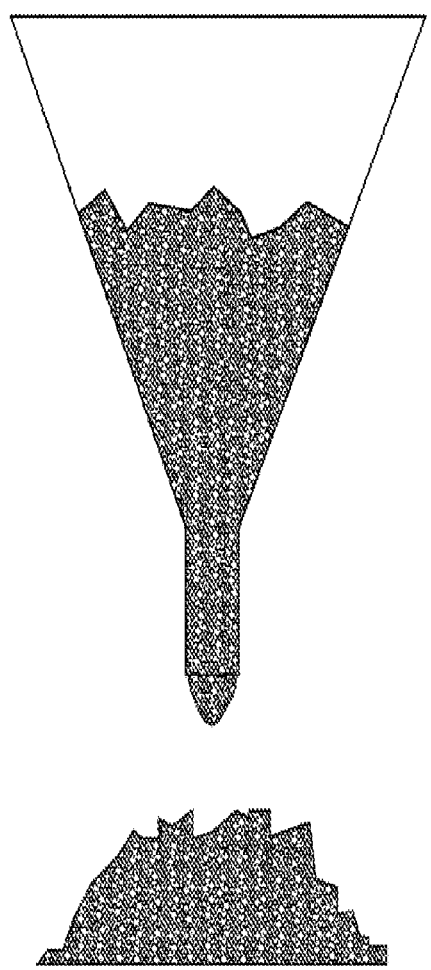
FIG. 1C is an illustration of caking present in particulate material absent the inventive composition.

FIG. 1C illustrates a sample of particulate material granules caking and therefore not passing through a feeder trough. Caking results from a number of factors including the hygroscopic nature of particulate material when in contact with moisture.

The effectiveness of the invention was quite surprising and in light of the teachings of the prior art the invention displays unexpected results. As described in U.S. Pat. No. 8,465,667, PVA has been combined with crude glycerin for use as a process additive in coal. Specifically this combination was used to prevent the oxidation that may occur when arches and ratholes form in coal flowing through funnels. It however provided no teachings regarding the prevention of caking and dusting in particulate materials which occur without respect to oxidation of flowing coal.

In fact in U.S. Pat. No. 8,298,439 it states that "formulations such as PVA form a rigid glue shell or crust. This rigid glue shell contains particulate matter when intact, but . . . tend to be brittle and shatter when subjected to significant movement or displacement." Dust release occurs precisely when the material is moving. Moreover as stated in U.S. patent application Ser. No. 13/826,385 because caking and dust release tend to be manifestations of diametrically opposite effects, there is no reason to expect that a single composition would resolve both problems. In fact one could expect that a dust control agent would hold the particulate material together better and exacerbate caking. And similarly one could expect that because an anti-caking agent reduces agglomeration, it would exacerbate dust release. Yet FIG. 1B illustrates how the invention simultaneously resolves both dust release and anti-caking effects. As a result one would not expect the anti-oxidation composition of U.S. Pat. No. 8,465,667 to function as well as the invention does.

In addition one would not expect glycerin to be effective as a dust control agent. As described in US Published Patent Application 2009/0178452 glycerin is not effective as a dust control agent because it is incapable of binding particulate materials together. That is why when using glycerin it teaches that the glycerin must have been changed into a no-longer glycerin material (by reaction with a polybasic acid into a polymeric derivative) before it will be conducive to dust control. As a result one would not expect a glycerin containing material to prevent dust formation in rapidly flowing masses of particulate material.

In at least one embodiment the PVA is in the form of a copolymer. Representative monomers that may be present in the copolymer include but are not limited to any one or more of: ethylene, acrylic acid, pyrrolidone, acrylic acids, butyl acrylate, vinyl alcohol, 2-ethyl hexylacrylate, acetylenes, acid chlorides, acroleins, acrylamides, acrylates, alcohols, ethers, esters, allyls, amines, anhydrides, butadienes, butenes, epoxides, ethylene halides, fumaric acids, fumaric esters, isocyanates, lactams, maleic acids, maleic esters, propenes, styrenes, vinyls, and any combination thereof, and/or any one or more of the monomers and/or polymers, (and/or their methods of synthesis and preparation) listed in one or more of the textbooks: *Polymer Handbook 4th Edition*, by J. Brandrup, et al., John Wiley & Sons Inc., (generally and in particular chapter III), (1999), *Vinyl Acetate Emulsion Polymerization and Copolymerization with Acrylic Monomers*, by H. Erbil, CRC Press, (generally and in particular chapter 5), (2000), and *Encyclopedia of Polymer Science and Engineering, 2nd Edition*, by Herman F. Mark, et al., John Wiley & Sons Inc., (generally and in particular chapters 1, 11, 12, 13, and 17), (1990), and any combination thereof. The addition of other monomers results in changes in property that are not anticipated by the teachings of US Published Patent Application 2009/0178452, U.S. Pat. Nos. 8,465,667 and 8,298,439 and U.S. patent application Ser. No. 13/826,385.

In at least one embodiment the composition has a higher viscosity than uncured PVA before application but a lower viscosity than cured PVA after 1 hour after it has been applied. The difference in viscosity may be due to the effects of the composition formulation, emulsion, and/or the copolymer on how the cross-linked three dimensional structure forms. The lower viscosity may allow the cured composition to bend and flex more than PVA alone. As a result cured emulsified PVA operates much better than cured un-emulsified PVA. This is in contrast to the teachings of U.S. Pat. No. 8,298,439 which suggest that PVA alone is always brittle when cured.

In at least one embodiment the emulsion is formed and/or is aided in formation by one or more emulsifier compositions and or shearing devices. Representative examples of such shearing devices and/or emulsifier compositions include but are not limited to those described in U.S. Pat. No. 7,938,934 and/or U.S. patent application Ser. No. 13/919,167.

In at least one embodiment the glycerin is emulsified (in a micelle) within another carrier phase (such as but not limited to water) and the PVA is emulsified in a micelle within the glycerin micelle.

In at least one embodiment the particulate material excludes low-ranked coal.

In at least one embodiment the particulate material excludes coal.

In at least one embodiment the composition excludes VAE.

In at least one embodiment the composition excludes crude glycerin.

In at least one embodiment the composition excludes polymer derivatives of glycerin.

In at least one embodiment the composition is in the form of an emulsion characterized in the glycerin functioning in part or in full as the carrier phase and the PVA is dispersed within micelles. Other materials may be present in the micelles and/or the carrier phase including but not limited to water.

Without being limited by a particular theory or design of the invention or of the scope afforded in construing the claims, it is believed that the combination of the PVA with the glycerin results in a formation of a composition whose attributes combine the best of both materials without the limitations of either. When it cures PVA transitions into a rigid brittle material that impairs flow and dust release. Glycerin is known to have poor dust control properties but it is unexpected that the combination of PVA with glycerin results in superior dust control properties. The combination of the two however forms a mixture which when cured overcomes PVA's rigidity and operates as an ideal dust control agent.

EXAMPLES

The foregoing may be better understood by reference to the following examples, which are presented for purposes of illustration and are not intended to limit the scope of the invention. In particular the examples demonstrate representative examples of principles innate to the invention and these principles are not strictly limited to the specific condition recited in these examples. As a result it should be understood that the invention encompasses various changes and modifications to the examples described herein and such changes and modifications can be made without departing from the spirit and scope of the invention and without diminishing its intended advantages. It is therefore intended that such changes and modifications be covered by the appended claims.

A number of laboratory evaluations were performed. Dust control and anticaking evaluations were conducted by treating particulate material at a specified dose then subjecting both treated and untreated samples to conditions known to cause either fugitive dust release or caking (agglomeration).

In the case of dust control evaluations, treated and untreated samples were milled under controlled conditions to generate fugitive dust, which was quantified gravimetrically. Anticaking evaluations subjected both treated and untreated samples to environmental conditions of elevated humidity and temperature, followed by agitation and abrasion to quantify the degree of sample caking. The result of the evaluations described in Table 1 demonstrate the ability of glycerin/polyvinyl acetate emulsion blends to reduce the dust forming tendency of monoammonium phosphate, which is prone to fugitive dust formation.

TABLE 1

| Monoammonium Phosphate Treatment | Fugitive Dust (ppm) | Dust Reduction Relative to Control |
|---|---|---|
| Untreated Control | 3684 | — |
| 1:1 glycerin/polyvinyl acetate - 4 lb/ton | 398 | 89% |
| Polyvinyl acetate emulsion | Untestable due to viscosity | — |

A second evaluation was conducted using a lower dosage of the inventive composition. The results demonstrate the ability of glycerin/polyvinyl acetate emulsion blends to reduce the caking tendency of potassium chloride which is prone to caking.

TABLE 2

| Potassium Chloride Treatment | Caking Reduction Relative to Control |
|---|---|
| Untreated Control | — |
| 1:1 glycerin/polyvinyl acetate - 2 lb/ton | 48% |

While this invention may be embodied in many different forms, there are described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments mentioned herein, described herein and/or incorporated herein. In addition the invention encompasses any possible combination that also specifically excludes any one or some of the various embodiments mentioned herein, described herein and/or incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g.

2.3 to 9.4, 3 to 8, 4 to 7), and finally to each number 1, 2, 3, 4, 5, 6, 7, 8, 9, and 10 contained within the range. All percentages, ratios and proportions herein are by weight unless otherwise specified.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A composition comprising
    a pile of particulate material comprising a dust generating material comprising a coal, a mineral fertilizer, a grain, or an ore;
    polyvinyl acetate; and
    glycerin,
wherein the polyvinyl acetate and glycerin are delivered to the pile in an emulsion and wherein the ratio of polyvinyl acetate to glycerin by weight in the composition is between 100:1 and 1:10, and wherein the dust forming tendency of the composition and the caking tendency of the composition are reduced compared to the pile of particulate material, and with the proviso that the composition excludes ethylene-vinyl-acetate copolymer.

2. The composition of claim 1 wherein the particulate material excludes low-ranked coal.

3. The composition of claim 1 wherein the particulate material excludes coal.

4. The composition of claim 1 wherein the composition excludes crude glycerin.

5. The composition of claim 1 wherein the composition excludes polymer derivatives of glycerin.

6. The composition of claim 1 wherein the particulate material in the absence of the glycerin and polyvinyl acetate would form one item selected from the list consisting of: ratholes, arches, pinch points, and any combination thereof.

7. The composition of claim 1 wherein the particulate material in the absence of the glycerin and polyvinyl acetate would cake.

8. The composition of claim 1 wherein the particulate material in the absence of the glycerin and polyvinyl acetate would cake but would not form one item selected from the list consisting of: ratholes, arches, pinch points, and any combination thereof.

9. The composition of claim 1 wherein the polyvinyl acetate is cured.

10. The composition of claim 1 wherein the emulsion comprises a carrier phase comprising the glycerin and a dispersed phase comprising the polyvinyl acetate.

11. The composition of claim 1 wherein the dust control and anti-caking properties of the composition are superior to the dust control and anti-caking properties of non-emulsified PVA bearing compositions.

12. The composition of claim 1 wherein the polyvinyl acetate is a copolymer of acrylic acid, pyrrolidone, an acrylate, vinyl alcohol, acrylamide, an ethylene halide, or a combination thereof.

13. The composition of claim 1 wherein the emulsion is cured.

* * * * *